US011139487B2

(12) United States Patent
Gong et al.

(10) Patent No.: US 11,139,487 B2
(45) Date of Patent: Oct. 5, 2021

(54) FUEL CELL ELECTROLYTE RESERVOIR

(71) Applicant: DOOSAN FUEL CELL AMERICA, INC., South Windsor, CT (US)

(72) Inventors: Ke Gong, Ellington, CT (US); Eric Livaich, South Windsor, CT (US); Donald J. L. Roy, Enfield, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 12 days.

(21) Appl. No.: 16/564,310

(22) Filed: Sep. 9, 2019

(65) Prior Publication Data

US 2020/0161674 A1    May 21, 2020

Related U.S. Application Data

(63) Continuation-in-part of application No. 16/198,178, filed on Nov. 21, 2018, now Pat. No. 10,892,498.

(51) Int. Cl.
  *H01M 8/0289*  (2016.01)
  *H01M 8/2483*  (2016.01)
  *H01M 8/0213*  (2016.01)
  *H01M 8/248*   (2016.01)

(52) U.S. Cl.
  CPC ....... *H01M 8/0289* (2013.01); *H01M 8/0213* (2013.01); *H01M 8/248* (2013.01); *H01M 8/2483* (2016.02)

(58) Field of Classification Search
  CPC .... H01M 8/026; H01M 8/2484; H01M 8/086; H01M 8/0213; H01M 2300/0008
  USPC ......................................................... 429/457
  See application file for complete search history.

(56) References Cited

U.S. PATENT DOCUMENTS

| | | |
|---|---|---|
| 4,366,211 A | 12/1982 | Pollack |
| 7,070,875 B2 | 7/2006 | Hoffmann |
| 7,807,313 B2 | 10/2010 | Kaye et al. |
| 8,216,737 B2 | 7/2012 | Sommer et al. |
| 8,298,719 B2 | 10/2012 | Mossman et al. |
| 8,546,034 B2 | 10/2013 | Katano et al. |
| 9,166,235 B2 | 10/2015 | Katano |
| 9,172,100 B2 | 10/2015 | Hotta et al. |
| 9,184,453 B2 | 11/2015 | Drouhault et al. |
| 9,231,259 B2 | 1/2016 | Kobayashi et al. |
| 9,991,525 B2 | 6/2018 | Takayama et al. |

(Continued)

FOREIGN PATENT DOCUMENTS

| | | | |
|---|---|---|---|
| JP | H07169473 A | | 7/1995 |
| JP | H09219205 A | | 8/1997 |
| JP | 6025667 B2 | | 11/2016 |

OTHER PUBLICATIONS

International Search Report and Written Opinion of the International Searching Authority for International application No. PCT/US2019/062364 dated Mar. 10, 2020.

*Primary Examiner* — Gary D Harris
(74) *Attorney, Agent, or Firm* — Carlson, Gaskey & Olds

(57) ABSTRACT

An illustrative example fuel cell device includes a cell stack assembly of a plurality of fuel cells that each include an anode and a cathode. A pressure plate is situated near one end of the cell stack assembly. An intermediate component is situated between the end of the cell stack assembly and the pressure plate. The intermediate component includes a porous material in at least two fluid reservoirs and a barrier between the two fluid reservoirs to prevent fluid communication between the reservoirs.

10 Claims, 2 Drawing Sheets

(56) References Cited

U.S. PATENT DOCUMENTS

| | | |
|---|---|---|
| 2005/0282060 A1 | 12/2005 | DeFillippis et al. |
| 2006/0051655 A1* | 3/2006 | Yoshitake ........... H01M 8/0232 |
| | | 429/462 |
| 2010/0122461 A1 | 5/2010 | Minas et al. |
| 2014/0045088 A1 | 2/2014 | Drouhault et al. |
| 2015/0086886 A1 | 3/2015 | Blank et al. |
| 2016/0254564 A1 | 9/2016 | Takeyama et al. |
| 2017/0098852 A1* | 4/2017 | Carnevale ........... H01M 8/0202 |
| 2017/0110754 A1 | 4/2017 | Nishiyama et al. |

* cited by examiner

FUEL CELL ELECTROLYTE RESERVOIR

CROSS-REFERENCE TO RELATED APPLICATIONS

This application is a continuation-in-part of U.S. patent application Ser. No. 16/198,178, which was filed on Nov. 21, 2018.

BACKGROUND

Fuel cells generate electricity based on an electrochemical reaction between reactants such as hydrogen and oxygen. Some fuel cells include a liquid electrolyte to facilitate the electrochemical reaction. Phosphoric acid is one example electrolyte.

A challenge presented by many phosphoric acid fuel cells is maintaining a sufficient amount of phosphoric acid over time. The useful lifetime of such a fuel cell depends on the amount of phosphoric acid available and how that is managed or maintained within the fuel cell device.

In some known fuel cell devices, liquid electrolyte condenses in the fuel manifolds and accumulates near a lower end of the device. Some configurations include an anode pressure plate that has a thickness that keeps the fuel cells near the lower end from the space near the bottom of the manifold where such acid may be retained. The pressure plate thickness has to be large enough to prevent any accumulated acid from reaching the cell stack assembly because if it does, it will flood the fuel cell(s) closest to the pressure plate resulting in a shutdown of the entire device.

SUMMARY

An illustrative example fuel cell device includes a cell stack assembly of a plurality of fuel cells that each include an anode and a cathode. A pressure plate is situated near one end of the cell stack assembly. An intermediate component is situated between the end of the cell stack assembly and the pressure plate. The intermediate component includes a porous material in at least two fluid reservoirs and a barrier between the two fluid reservoirs to prevent fluid communication between the reservoirs.

In an example embodiment having one or more features of the fuel cell device of the previous paragraph, the porous material in each of the reservoirs comprises a porous plate.

In an example embodiment having one or more features of the fuel cell device of any of the previous paragraphs, the porous plates have a thickness corresponding to a depth of the fluid reservoirs.

In an example embodiment having one or more features of the fuel cell device of any of the previous paragraphs, the porous plates provide structural support between the pressure plate and the cell stack assembly.

In an example embodiment having one or more features of the fuel cell device of any of the previous paragraphs, the intermediate component includes a first opening on a first side of the intermediate component adjacent the first side of the cell stack assembly, the first opening is configured to allow liquid electrolyte to enter a first one of the fluid reservoirs, the intermediate component includes a second opening on a second side of the intermediate component adjacent the second side of the cell stack assembly, the second opening is configured to allow liquid electrolyte to enter a second one of the fluid reservoirs, and the barrier prevents fluid communication between the first opening and the second opening.

An example embodiment having one or more features of the fuel cell device of any of the previous paragraphs includes a manifold configured to deliver the first and second reactants to the fuel cells. The manifold includes a first portion adjacent the first side of the intermediate component, the first portion of the manifold contains the first reactant, the manifold includes a second portion adjacent the second side of the intermediate component, the second portion of the manifold contains the second reactant, and the barrier prevents fluid communication between the first and second portions of the manifold.

In an example embodiment having one or more features of the fuel cell device of any of the previous paragraphs, the intermediate component comprises an electrically conductive material that is configured to carry electrical current from the cell stack assembly to a current collector.

In an example embodiment having one or more features of the fuel cell device of any of the previous paragraphs, the electrically conductive material comprises graphite.

In an example embodiment having one or more features of the fuel cell device of any of the previous paragraphs, the intermediate component comprises a spacer having a height that includes a depth of the reservoirs and the height establishes a space between an end of the cell stack assembly and the pressure plate.

In an example embodiment having one or more features of the fuel cell device of any of the previous paragraphs, the intermediate component comprises a cooler that is configured to carry coolant fluid through a portion of the cooler and the fluid reservoirs are separate from the portion of the cooler.

Various features and advantages of at least one disclosed example embodiment will become apparent to those skilled in the art from the following detailed description. The drawings that accompany the detailed description can be briefly described as follows.

DETAILED DESCRIPTION

Embodiments of this invention include an intermediate component, such as a spacer or a cooler, that can be situated between a cell stack assembly and a pressure plate. The intermediate component defines at least two reservoirs for fluid, which are isolated from each other. With such an intermediate component, cost savings can be realized by requiring less material for the pressure plate and manifold or by allowing for additional fuel cells to be added to the cell stack assembly to provide higher efficiency or output.

Figure 1:
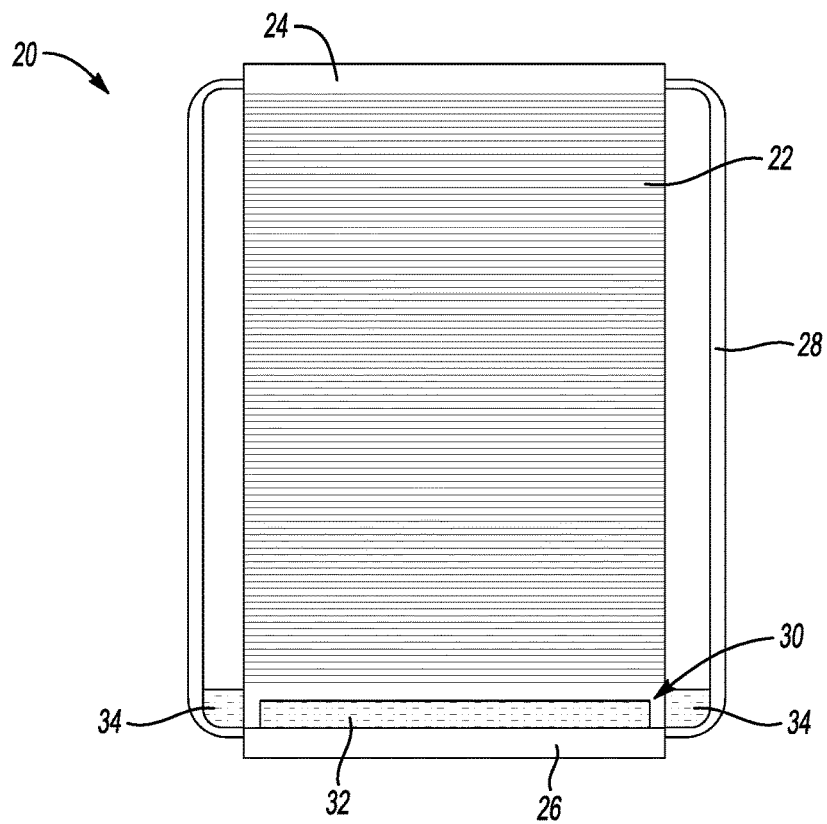
FIG. 1 schematically illustrates an example fuel cell device designed according to an embodiment of this invention.

FIG. 1 schematically shows a fuel cell device 20 that may be incorporated into a fuel cell power plant. A cell stack assembly 22 includes a plurality of fuel cells each having an anode and a cathode. The fuel cells in this example embodiment are phosphoric acid fuel cells that rely upon phosphoric acid as a liquid electrolyte within a matrix between the anode and cathode of each fuel cell. Some embodiments include another liquid electrolyte.

The cell stack assembly 22 is maintained between pressure plates 24 and 26 near opposite ends of the cell stack assembly 22. A manifold 28 facilitates supplying reactants, such as hydrogen and oxygen, to the cell stack assembly 22.

An intermediate component 30 is situated between the pressure plate 26 and the adjacent end of the cell stack assembly 22. In the example shown in FIG. 1, the intermediate component 30 is a spacer. The intermediate component 30 defines at least two reservoirs where fluid may accumulate between the cell stack assembly 22 and the pressure plate 26. In the illustration, phosphoric acid is schematically shown at 32 in a reservoir established by the intermediate component 30. Additional phosphoric acid at 34 is retained in a portion of the manifold 28 that is situated adjacent the intermediate component 30.

Figure 2:
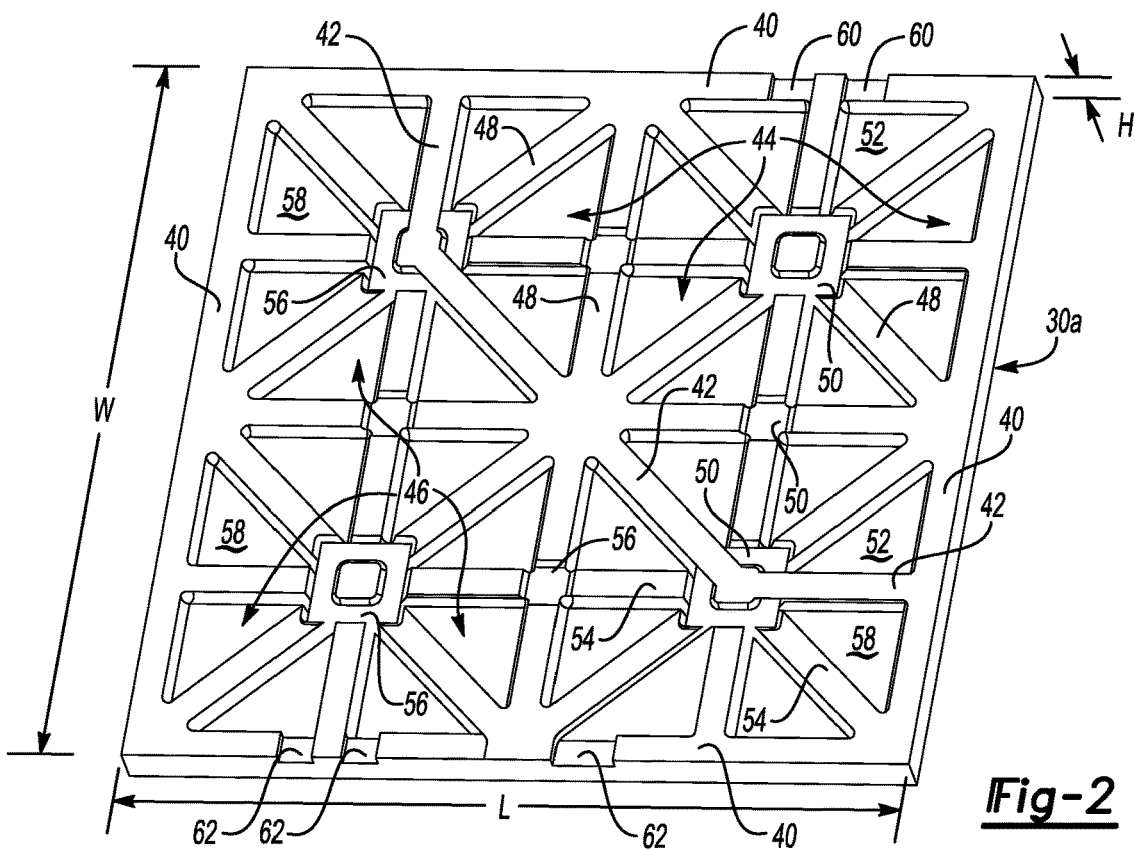
FIG. 2 illustrates an example intermediate component, which is a spacer.

FIG. 2 illustrates an example intermediate component 30, which is a spacer 30a. A body of the spacer 30a has a length L, a width W, and a height H. The length is greater than the height and the width is greater than the height. In the illustrated example, the length and width are approximately equal although that is not required. The height H establishes a spacing between an end of the cell stack assembly 22 and the pressure plate 26.

The spacer 30a comprises an electrically conductive material that carries electrical current from the fuel cells of the cell stack assembly 22 to the pressure plate 26, which acts as a current collector. The spacer 30a, in the illustrated example, comprises graphite, which has the beneficial feature of reducing electrical resistance and, therefore, voltage loss.

The spacer 30a has a plurality of ribs including outer edge ribs 40 and at least one divider rib 42 that collectively define at least two reservoirs 44 and 46. The divider rib 42 isolates the reservoir 44 from the reservoir 46. Fluid in either reservoir 44 or 46 is isolated from fluid in the other reservoir.

The illustrated example includes additional ribs that are referred to as strengthening ribs because they provide additional strength to the spacer 30a and withstand the forces urging the pressure plate 26 toward the end of the cell stack assembly 22. Strengthening ribs 48 are situated within the reservoir 44. The strengthening ribs 48 have a thickness in the height direction of the spacer 30a that corresponds to a depth of the reservoir 44. A plurality of channels 50 are associated with at least some of the strengthening ribs 48 to allow for fluid within the reservoir 44 to flow between and among cavities 52 that are defined by the strengthening ribs 48 within the reservoir 44.

Similar strengthening ribs 54 are provided within the reservoir 46. Channels or passages 56 are associated with at least some of the strengthening ribs 54 to allow for fluid communication among cavities 58 within the reservoir 46.

One of the outer edge ribs 40 includes at least one channel 60 that allows fluid communication between the reservoir 44 and a first portion of the manifold 28 where the phosphoric acid is situated at 34 in FIG. 1, for example. An oppositely facing outer edge rib 40 includes at least one channel 62 to allow for fluid communication between the reservoir 46 and the adjacent portion of the manifold 28 where phosphoric acid 34 may accumulate.

In the illustrated example, phosphoric acid associated with a first fuel turn of the cell stack assembly 22 accumulates in a portion of the manifold 28 adjacent the channels 62, which allow such phosphoric acid to enter into and accumulate within the reservoir 46. Phosphoric acid associated with a second fuel turn can accumulate within the portion of the manifold 28 adjacent channels 60 where such phosphoric acid may accumulate within the reservoir 44.

The divider rib 42 is a barrier between the reservoirs 44 and 46 and the first and second fuel turns. The divider rib 42, therefore, is a barrier that prevents fluid communication between opposite sides of the spacer 30a. Preventing such fluid movement across the entire spacer 30a prevents one reactant or fuel, such as hydrogen, in one side of the manifold 28 from moving into the opposite side of the manifold 28 where the other reactant, such as oxygen, is present. The barrier established by the divider rib 42 prevents reactant mixing at the bottom of the cell stack assembly 22 while allowing the spacer 30a to include the reservoirs 44 and 46 to receive and store or hold liquid electrolyte that accumulates near the bottom of the fuel cell device 20 over time.

Figure 3:
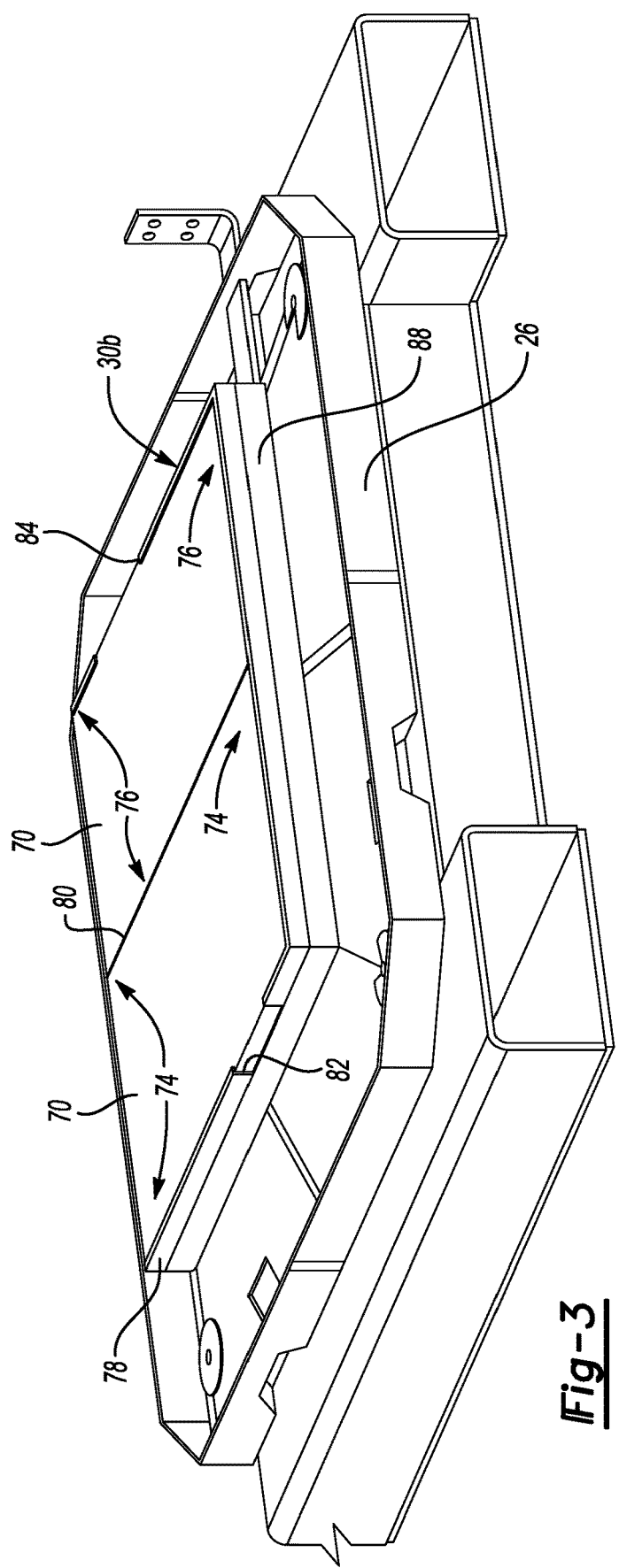
FIG. 3 illustrates another example intermediate component, which is a spacer.

Another style of intermediate component 30, which is a spacer 30b, is shown in FIG. 3. This example spacer 30b includes porous material 70 within reservoirs 74 and 76 that are defined within a frame 78 of the spacer 30b. A barrier 80 separates the reservoirs 74 and 76.

One side of the spacer 30b includes an opening 82 in the frame to allow liquid electrolyte to be absorbed by the porous material 70 in the reservoir 74. An opening 84 in an opposite side of the frame 78 allows liquid electrolyte to enter the reservoir 76 where it is absorbed and retained by the porous material 70. The barrier 80 prevents any fluid flow between the one side of the spacer 30b, which includes the opening 82, and the other side, which includes the opening 84. The barrier 80 prevents any fluid flow between the corresponding opposite sides of the manifold (28 in FIG. 1) so that the reactants of the first and second turns of the cell stack assembly do not mix near the bottom of the stack.

The porous material 70 absorbs liquid electrolyte that accumulates near the bottom of the cell stack assembly 22. In this example the spacer 30b is situated against a current collector 88.

The porous material 70 in the illustrated embodiment also provides structural support under the cell stack assembly in addition to absorbing liquid electrolyte. The porous material 70 has a thickness or height that corresponds to a height or depth of the reservoirs 74 and 76. With a rigid or firm porous material 70, the plurality of ribs included in the embodiment shown in FIG. 2 are not necessary. In some embodiments, the porous material 70 comprises a porous graphite plate. Using a structurally supportive porous material 70 increases the volume available for accumulating liquid electrolyte rather than taking up some of that volume with structural ribs.

Another feature of the porous material 70 in the illustrated embodiment is that it is electrically conductive to assist in transferring electrical current to the current collector 88.

Figure 4:
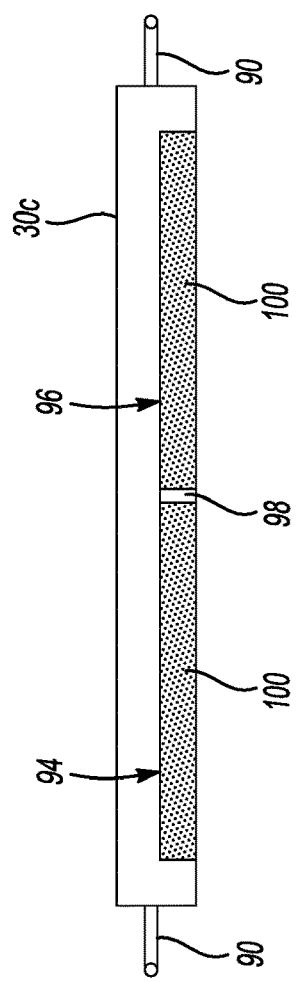
FIG. 4 schematically illustrates another example intermediate component, which is a cooler.

FIG. 4 shows another example intermediate component 30, which is a cooler 30c that includes coolant carrying tubes 90 within one portion of the cooler 30c. The cooler 30c includes reservoirs 94 and 96 separated by a barrier 98, which prevents fluid flow between the reservoirs 94 and 96 and between the sides of the manifold (28 in FIG. 1) in a manner similar to the barrier 80 and the dividing rib 42 described above.

The reservoirs 94, 96 are separated from the portion of the cooler 30c that includes the tubes 90 so that any fluid in the reservoirs 94, 96 will not interfere with the cooling properties of the cooler 30c.

A porous material 100, such as a porous graphite plate, is included in the reservoirs 94 and 96 in this embodiment. The porous material 100 has a thickness corresponding to the depth or height of the reservoirs 94 and 96 and the porous material 100 provides structural support to the cooler 30c.

There are several features of the illustrated example embodiments that provide improvements compared to previous fuel cell device designs. One aspect of utilizing an intermediate component 30 for receiving and holding liquid electrolyte is that it decreases the required thickness of the pressure plate 26. The intermediate component 30 occupies space within the portion of the manifold 28 where liquid electrolyte, such as phosphoric acid, may accumulate to prevent the electrolyte from flooding the lower cells of the cell stack assembly 22. The height H of the intermediate component 30 is significantly less than the thickness or height previously used for the pressure plate 26. This is possible because the intermediate component 30 includes at least the two reservoirs (e.g., 44 and 46, 74 and 76, 94 and 96) for retaining liquid electrolyte. Without those reservoirs, the only location for phosphoric acid near the bottom of the device 20 was between the manifold 28 and the pressure plate. Instead of occupying over 150 mm of the bottom portion of the manifold 28 with a larger pressure plate (or a spacer if a spacer was present), the intermediate component 30 includes at least two reservoirs to retain liquid electrolyte within the space occupied by the reservoirs. The height H of the intermediate component 30, in some embodiments in which the intermediate component 30 is a spacer, is less than 40 mm Some fuel cell power plants will benefit from a spacer height of approximately 33 mm while other fuel cell power plant configurations will benefit from a spacer having a height H of approximately 23 mm Spacer heights between 35 mm and 20 mm are useful in many installations.

The decreased thickness or height of the intermediate component 30, compared to previous configurations that relied upon a thicker pressure plate, provides on the order of 75% or 80% space savings, which translates into a more cost-effective fuel cell device. The additional space previously occupied by a thicker pressure plate may now be occupied with additional fuel cells in the cell stack assembly 22. This allows for providing greater efficiency and more power output within the same packaging envelope occupied by previous configurations. Alternatively, the size of the fuel cell device 20 may be reduced, which provides material cost savings by having a smaller manifold 28, smaller pressure plate, and a smaller overall footprint or packaging size for a fuel cell power plant. Either approach provides a lower levelized cost of electricity (LCOE). This is significant because those skilled in the art are striving to be able to reduce the cost of fuel cell power plants without sacrificing performance.

The reservoirs of the intermediate component 30 allow for storing additional liquid electrolyte within a fuel cell device, which can contribute to longer fuel cell life. Although the liquid electrolyte that accumulates in the reservoirs of the intermediate component 30 does not get reintroduced to the fuel cells of the cell stack assembly 22, the capacity of the reservoirs allows for providing more liquid electrolyte in the fuel cell device 20 at installation. Having more liquid electrolyte available when the device is new is advantageous but may result in an increased or more rapid accumulation of liquid electrolyte near the bottom of the cell stack assembly 22. The reservoirs of the intermediate component 30 provide an effective way to manage such accumulation near the bottom of the cell stack assembly 22 to avoid flooding the lowest cells of the stack.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:
1. A fuel cell device, comprising: a cell stack assembly including a plurality of fuel cells that each include an anode and a cathode; a pressure plate near one end of the cell stack assembly; and an intermediate component between the end of the cell stack assembly and the pressure plate, the intermediate component including a porous material in at least two fluid reservoirs and a barrier that separates the at least two fluid reservoirs, the barrier preventing fluid communication between the reservoirs and across the intermediate component from one side of the cell stack assembly exposed to a first reactant to a second side of the cell stack assembly exposed to a second reactant.

2. The fuel cell device of claim 1, wherein the porous material in each of the reservoirs comprises a porous plate.

3. The fuel cell device of claim 2, wherein the porous plates have a thickness corresponding to a depth of the fluid reservoirs.

4. The fuel cell device of claim 3, wherein the porous plates provide structural support between the pressure plate and the cell stack assembly.

5. The fuel cell device of claim 1, wherein
the intermediate component includes a first opening on a first side of the intermediate component adjacent the first side of the cell stack assembly;
the first opening is configured to allow liquid electrolyte to enter a first one of the fluid reservoirs;
the intermediate component includes a second opening on a second side of the intermediate component adjacent the second side of the cell stack assembly;
the second opening is configured to allow liquid electrolyte to enter a second one of the fluid reservoirs; and
the barrier prevents fluid communication between the first opening and the second opening.

6. The fuel cell device of claim 5, comprising a manifold configured to deliver the first and second reactants to the fuel cells and wherein
the manifold includes a first portion adjacent the first side of the intermediate component;
the first portion of the manifold contains the first reactant;
the manifold includes a second portion adjacent the second side of the intermediate component;
the second portion of the manifold contains the second reactant; and
the barrier prevents fluid communication between the first and second portions of the manifold.

7. The fuel cell device of claim 1, wherein the intermediate component comprises an electrically conductive material that is configured to carry electrical current from the cell stack assembly to a current collector.

8. The fuel cell device of claim 7, wherein the electrically conductive material comprises graphite.

9. The fuel cell device of claim 1, wherein
the intermediate component comprises a spacer having a height that includes a depth of the reservoirs; and
the height establishes a space between an end of the cell stack assembly and the pressure plate.

10. The fuel cell device of claim 1, wherein
the intermediate component comprises a cooler that is configured to carry coolant fluid through a portion of the cooler; and the fluid reservoirs are separate from the portion of the cooler.

\* \* \* \* \*